United States Patent Office 2,735,767
Patented Feb. 21, 1956

2,735,767
SENSITIZED PHOTOGRAPHIC EMULSION

Leslie G. S. Brooker, Rochester, N. Y., assignor to Eastman Kodak Company, Rochester, N. Y., a corporation of New Jersey No Drawing. Application September 4, 1952, Serial No. 307,925

8 Claims. (Cl. 95—7)

This invention relates to sensitized photographic emulsions and new sensitizing dyes.

Meso-phenylcarbocyanine dyes have been previously described in the art, and photographic silver halide emulsions containing such dyes have also been described. Unfortunately, such meso-phenylcarbocyanine dyes have not been particularly efficacious in their own right for extending the sensitivity of such photographic silver halide emulsions. (See, for example, Carroll U. S. Patent 2,533,427, issued December 12, 1950.)

I have now found that meso-phenylcarbocyanine dyes containing a hydroxyl group in the para position of the said phenyl group, the heterocyclic nuclei being of a certain type, are excellent sensitizers in their own right for photographic silver halide emulsions.

It is, therefore, an object of my invention to provide new photographic sensitizing dyes and a method for preparing such dyes. Another object is to provide photographic silver halide emulsions sensitized with my new dyes, and methods for preparing such sensitized emulsions. Other objects will become apparent from a consideration of the following description and examples.

The new dyes of my inventoin can be represented by the following general formula:

I

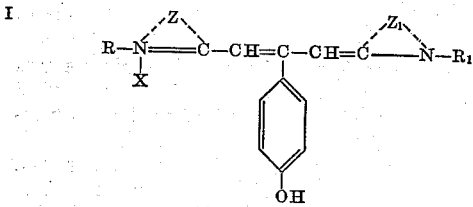

wherein R and R₁ each represents an alkyl group, such as methyl, ethyl, n-propyl, isopropyl, n-butyl, isobutyl, n-amyl, benzyl (phenylmethyl), β-phenylethyl, β-hydroxyethyl, β-carbomethoxyethyl, etc., X represents an acid radical, such as chloride, bromide, iodide, perchlorate, thiocyanate, methylsulfate, ethylsulfate, p-toluenesulfonate, benzenesulfonate, etc., and Z and Z₁ each represents the non-metallic atoms necessary to complete a heterocyclic nucleus selected from the group consisting of those of the benzothiazole series (e. g. benzothiazole, 5-chlorobenzothiazole, 5-bromobenzothiazole, 5-methoxybenzothiazole, 5-ethoxybenzothiazole, 5-hydroxybenzothiazole, 6-chlorobenzothiazole, 6-bromobenzothiazole, 6 - methoxybenzothiazole, 6-ethoxybenzothiazole, 5-dimethylaminobenzothiazole, 5 - methylbenzothiazole, 5-ethylbenzothiazole, etc.), and those of the naphthothiazole series, such as α-naphthothiazole, β-naphthothiazole, etc.

The dyes represented by Formula I above can advantageously be prepared by condensing a compound selected from those represented by the following general formula:

II

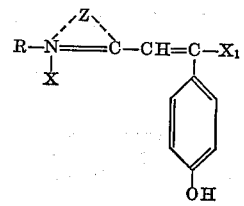

wherein R, X and Z each have the values given above and X₁ represents a halogen atom, e. g. chlorine, bromine, etc. with a quaternary salt selected from those represented by the following general formula:

III

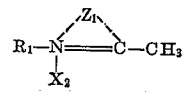

wherein R₁ and Z₁ each have the values given above and X₂ represents an acid radical, such as chloride, bromide, iodide, persulfate, thiocyanate, ethylsulfate, methylsulfate, benzenesulfonate, p-toluenesulfonate, etc.

The condensation can advantageously be carried out in the presence of a basic condensing agent, such as triethylamine, tri-n-propylamine, triisopropylamine, tri-n-butylamine, N-methylpiperidine, N-ethylpiperidine, N,N-dimethylaniline, N,N-diethylaniline, etc. Heat accelerates the condensation, and temperatures varying from room temperature to the reflux temperature of the reaction mixture can be used. The condensation can also be carried out advantageously in the presence of an inert diluent, such as a lower aliphatic alcohol (e. g. ethanol, n-propanol, n-butanol, isobutanol, etc.), acetone, 1,4-dioxane, etc.

The intermediates represented by Formula II can advantageously be prepared by heating a compound selected from those represented by the following general formula:

II-a

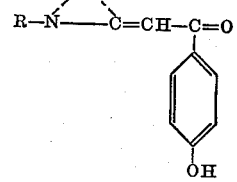

wherein R and Z have the values given above together with a phosphorus oxyhalide, such a process being described in Brooker and White, U. S. Patent 2,231,659, issued February 11, 1941. The intermediates represented by Formula II-a above can be prepared by hydrolyzing a compound selected from those represented by the following general formula:

II-b

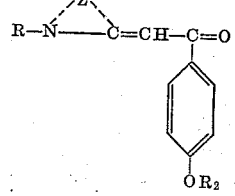

wherein R and Z each have the values given above and R₂ represents an alkyl group (e. g. methyl, ethyl, etc.) by heating said compound in the presence of an aqueous acid solution (e. g. hydrobromic acid, a mixture of hydrobromic and glacial acetic acid, etc.). The intermediates represented by Formula II–b, above can advantageously be prepared by heating together a compound selected from those represented by the following general formula:

IV
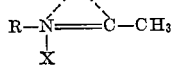

wherein R, Z and X each have the values given above with a compound selected from those represented by the following general formula:

V
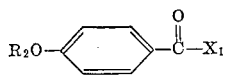

wherein $R_2$ and $X_1$ each have the values given above, in the presence of an acid-binding agent, e. g. pyridine, quinoline, etc.

The following examples will serve to illustrate more fully the manner whereby the new dyes of my invention are prepared.

*Example 1.—3,3'-diethyl-9-p-hydroxyphenylthiacarbocyanine iodide*

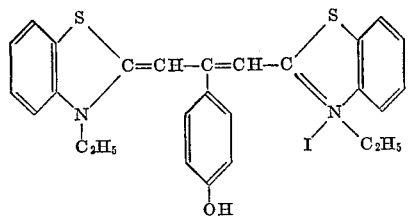

1.49 grams (1 mol.) of 3-ethyl-2-p-hydroxybenzoylmethylenebenzothiazoline, 3.07 grams (1 mol.+200% excess) of phosphorus oxychloride and 30 cc. of dry benzene were refluxed 3.5 hours. After standing a short time at room temperature, the yellowish solid was filtered off, ground up with acetone and again filtered off and dried. To the crude 2-(β-chloro-p-hydroxyphenylstyryl) benzothiazole ethochloride was added 1.75 grams (1 mol.) of 2-methylbenzothiazole etho-p-toluenesulfonate, 1.01 grams (2 mols.) of triethylamine and 35 cc. of ethyl alcohol and the resulting mixture allowed to remain 40 minutes at room temperature, and then refluxed 5 minutes. The dye was then precipitated with an excess of aqueous potassium iodide, chilled, filtered off, washed with ether then water and finally with acetone, and crystallized twice from ethyl alcohol (66 cc./gram). The green needles melted at 298–300° C. dec. It sensitized a photographic gelatino-silver-bromoiodide emulsion to about 645 mμ with maximum sensitivity at about 620 mμ.

3-ethyl - 2 - p-hydroxybenzoylmethylenebenzothiazoline was made as follows:

15.6 grams (1 mol.) of 3-ethyl-2-p-methoxybenzoylmethylenebenzothiazoline (made from 2-methylbenzothiazole etho-p-toluenesulfonate and p-methoxybenzoyl chloride in pyridine solution), 100 cc. of 48% hydrobromic acid and 30 cc. of glacial acetic were refluxed for 24 hours. The resulting clear amber solution was poured into 1 liter of water and made basic with piperidine. After chilling, the yellow solid was filtered off, boiled with 150 cc. of acetone, chilled and filtered off. The light yellow 3-ethyl-2-p-hydroxybenzoylmethylenebenzothiazoline melted at 310–315° C. dec. and was used as such without further purification.

*Example 2.—9-p-hydroxyphenyl-3,3'-dimethylthiacarbocyanine chloride*

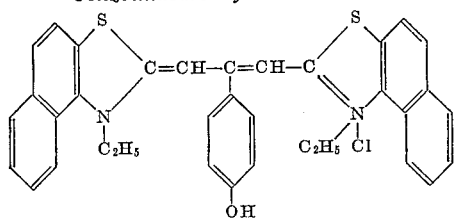

2.83 grams (1 mol.) of 2-p-hydroxybenzoylmethylene-3-methylbenzothiazoline, 6.14 grams (1 mol.+300% excess) of phosphorus oxychloride, and 100 cc. of dry benzene were refluxed for two hours. After cooling to room temperature, the yellowish solid was filtered off and washed well with acetone. The crude 2-(β-chloro-p-hydroxystyryl) benzothiazole methochloride was added to 3.35 grams (1 mol.) of 2-methylbenzothiazole metho-p-toluenesulfonate, 2.02 grams (2 mols.) of triethylamine, and 50 cc. of ethyl alcohol, and the resulting mixture was refluxed for ten minutes. After the reaction mixture was chilled, the crude dye was filtered off and washed with acetone and then with water. After two recrystallizations from glacial acetic acid (125 cc./gram) the yield was 10% of the theoretical. The purplish needles melted at 258–260° C. dec. The dye sensitized a photographic gelatino-silver-bromiodide emulsion to about 640 mμ with a maximum at about 605 mμ.

*Example 3.—3,3'-diethyl-9-p-hydrophenyl-4,5; 4',5'-dibenzothiacarbocyanine chloride*

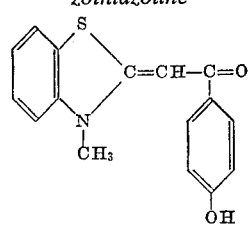

2.2 grams (1 mol.) of 1-ethyl-2-p-hydroxybenzoylmethylene-2(1H)-naphtho[1,2]thiazoline, 3.9 grams (1 mol.+300% excess) of phosphorus oxychloride, and 60 cc. of dry benzene were refluxed for three hours. The warm mixture was filtered and the solid washed well with acetone. The crude 2-(β-chloro-p-hydroxystyryl)naphtho[1,2]thiazole ethochloride was added to 2.53 grams (1 mol.) of 2-methylnaphtho[1,2]thiazole etho-p-toluenesulfonate, 1.3 grams (2 mols.) of triethylamine, and 75 cc. of ethyl alcohol, and the resulting mixture was refluxed for ten minutes. A saturated solution of 6 grams of ammonium chloride was added to the warm reaction mixture, and the resulting solution cooled to 0° C. The crude dye was filtered off, washed with water, and recrystallized from methyl alcohol (500 cc./gram). The dark bronze crystals melted at 235–238° C. dec. The dye sensitized a photographic - gelatino - silver - bromiodide emulsion to about 675 mμ with maximum sensitivity at about 630 mμ.

The following examples describe the preparation of the intermediates used in Examples 2 and 3.

*Example 4.—2-p-hydroxybenzoylmethylene-3-methylbenzothiazoline*

35 grams (1 mol.) of 2-p-methoxybenzoylmethylene-3-methylbenzothiazoline (prepared from 2-methylbenzothiazole metho-p-toluenesulfonate and p-methoxybenzoyl chloride in pyridine, M. P. 166-169° C.), 225 cc. of 48% hydrobromic acid, and 68 cc. of glacial acetic acid were refluxed for sixteen hours. The reaction mixture was poured into 3 liters of cold water. After standing for two hours at 0° C., the product was filtered off, washed well with water, and dried. The pale yellow crystals melted at 249-251° C. dec.

*Example 5.*—*1-ethyl - 2 - p - hydroxybenzoylmethylene-2-(1H)-naphtho[1,2]thiazoline*

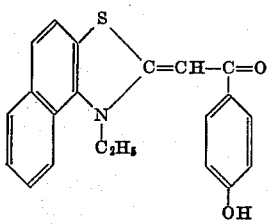

18 grams (1 mol.) of 1-ethyl-2-p-methoxybenzoylmethylene-2(1H)-naphtho[1,2]thiazoline (prepared from 2-methylnaphtho[1,2] thiazole etho-p-toluenesulfonate and p-methoxybenzoyl chloride in pyridine, M. P. 171-174° C.), 115 cc. of 48% hydrobromic acid, and 35 cc. of glacial acetic acid were refluxed for 20 hours. The solution was poured into 2 liters of water and made alkaline with sodium carbonate. After cooling, the solid was filtered off, washed with water, and dried. The yellow crystals melted at 237-238° C. dec.

As shown above I have found that my new dyes spectrally sensitize photographic silver halide emulsions when incorporated therein. The dyes are especially useful for extending the spectral sensitivity of the customarily employed gelatino-silver-chloride, gelatino-silver-chlorobromide, gelatino-silver-bromide and gelatino-silver bromiodide developing-out emulsions. To prepare emulsions sensitized with one or more of my new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol or acetone has proved satisfactory as a solvent for most of my new dyes. Where the dyes are quite insoluble in methyl alcohol, a mixture of acetone and pyridine is advantageously employed as a solvent. The dyes are advantageously incorporated in the finished, washed emulsions and should be uniformly distributed throughout the emulsions. The particular solvent used will, of course, depend on the solubility properties of the particular dye.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of my new dyes, the following procedure is satisfactory.

A quantity of dye is dissolved in methyl alcohol or acetone (or a mixture of acetone and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of my dyes, from 10 to 20 mg. of dye per liter of gelatino-silver-bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

It is known that photographic gelatino-silver-halide emulsions can be sensitized by means of monomethine (cyanine) dyes, such as 1'-ethyl-3-methylthia-2'-cyanine iodide. However, the preparation of such dyes by condensing an alkylmercapto quaternary salt with a quaternary salt containing a methyl group in a reactive position involves the hazard of forming mercaptan. It has been found that this hazard can be avoided by condensing a heterocyclic base containing a halogen atom in a reactive position with morpholine or piperidine to produce the corresponding morpholinyl or piperidyl derivative, which can be quaternized with an alkyl salt in the usual manner and condensed with a quaternary salt containing a methyl group in a reactive position to produce the desired dye, for example:

*Example 6.*—*2-(4-morpholinyl)benzothiazole*

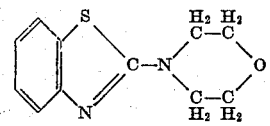

A mixture of 5.0 cc. of ethanol (or isopropanol), 1.9 g. (2.2 moles) of morpholine (practical grade), and 1.7 g. of 2-chlorobenzothiazole was refluxed for one hour and then poured with stirring into 40 cc. of cold water. The granular white solid which separated was collected on a funnel, washed with water, and then dried in a steam cabinet. The yield was quantitative (about 2.2 g.). The product was recrystallized from ligroin (B. P. 60°-90° C.) (0.28 cc. per gram of dye) to give long flat needles melting at 119°-120° C.

*Example 7.*—*3-methyl-2-(4-morpholinyl)benzothiazolium p-toluene-sulfonate*

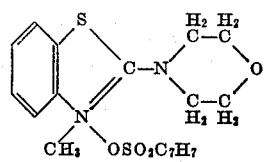

A mixture of 2.2 g. (1 mole) of 2-(4-morpholinyl)-benzothiazole and 1.95 g. (1.05 moles) of methyl p-toluenesulfonate was fused on an oil bath at 130° C. for one hour. The white cake which formed was cooled, broken up, and ground in a mortar with acetone, filtered, washed with acetone, ether and dried. The yield was 3.94 g. of a white solid melting at 203°-205° C.

*Example 8.*—*1-ethyl-3-methylthia-2-cyanine iodide*

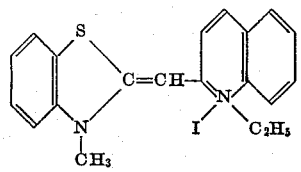

A suspension of 0.3 g. (1 mole) of quinaldine ethiodide and 0.4 g. (1 mole) of 3-methyl-2-(4-morpholinyl)-benzothiazolium p-toluenesulfonate in 4.0 cc. of dry pyridine was heated to about 95° C. by means of a steam bath. After most of the solid had dissolved, 0.11 g. (1.1 moles) of triethylamine was added. Dye formation was rapid and the mixture soon set to a solid. After heating for one hour on the steam pot, the reaction mixture was chilled, collected on a filter, washed with acetone, water, acetone and dried. The yield of dye was 0.3 g. (or about 70% of the theoretical amount) after recrystallization from methyl alcohol. The orange needles melted with decomposition at 266°–267° C.

The abbreviation "dec." used herein means with decomposition. That is, while the melting points obtained were true melting points in that they were reproducible, some decomposition of the compound was observed at the melting point.

What I claim as my invention and desire secured by Letters Patent of the United States is:

1. A photographic silver halide emulsion sensitized with a symmetrical sensitizing dye selected from those represented by the following general formula:

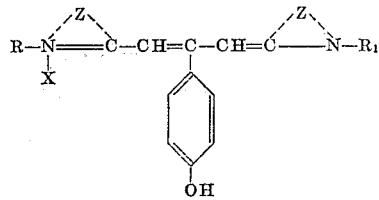

wherein R and R₁ each represents an alkyl group, X represents an acid radical, and Z represents the non-metallic atoms necessary to complete a heterocyclic nucleus selected from the group consisting of those of the benzothiazole series and those of the naphthothiazole series.

2. A photographic gelatino-silver halide developing-out emulsion sensitized with a symmetrical sensitizing dye selected from those represented by the following general formula:

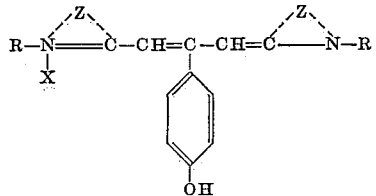

wherein R represents an alkyl group containing from 1 to 2 carbon atoms, X represents an acid radical, and Z represents the non-metallic atoms necessary to complete a heterocyclic nucleus selected from the group consisting of those of the benzothiazole series and those of the naphthothiazole series.

3. A photographic gelatin-silver-halide developing-out emulsion sensitized with a 9-p-hydroxyphenyl-3,3'-dimethylthiacarbocyanine salt.

4. A photographic gelatino-silver-halide developing-out emulsion sensitized with 9-p-hydroxyphenyl-3,3'-dimethylthiacarbocyanine chloride.

5. A photographic gelatino-silver-halide developing-out emulsion sensitized with a 3,3'-diethyl-9-p-hydroxyphenylthiacarbocyanine salt.

6. A photographic gelatino-silver-halide developing-out emulsion sensitized with 3,3'-diethyl-9-hydroxyphenyl-thiacarbocyanine iodide.

7. A photographic gelatino-silver-halide developing-out emulsion sensitized with a 3,3'-diethyl-9-p-hydroxyphenyl-4,5;4',5'-dibenzothiacarbocyanine salt.

8. A photographic gelatino-silver-halide developing-out emulsion sensitized with a 3,3'-diethyl-9-p-hydroxyphenyl-4,5;4',5'-dibenzothiacarbocyanine chloride.

References Cited in the file of this patent

UNITED STATES PATENTS

| | | |
|---|---|---|
| 2,107,379 | Koslowsky | Feb. 8, 1938 |
| 2,378,783 | Nawiasky et al. | June 19, 1945 |
| 2,438,704 | Kendall et al. | Mar. 30, 1948 |